(12) United States Patent
Barren et al.

(10) Patent No.: US 10,434,920 B2
(45) Date of Patent: Oct. 8, 2019

(54) FOOTREST ASSEMBLY FOR A MOTOR VEHICLE

(71) Applicant: FORD GLOBAL TECHNOLOGIES, LLC, Dearborn, MI (US)

(72) Inventors: Robert Patrick Barren, Allen Park, MI (US); Tom Peter Goffas, Ann Arbor, MI (US); William Charles Bauer, Canton, MI (US); Bryn Arthur Davies, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 510 days.

(21) Appl. No.: 15/158,162

(22) Filed: May 18, 2016

(65) Prior Publication Data
US 2017/0334330 A1    Nov. 23, 2017

(51) Int. Cl.
*B60N 3/06* (2006.01)
*B60R 16/02* (2006.01)

(52) U.S. Cl.
CPC .............. *B60N 3/066* (2013.01); *B60R 16/02* (2013.01)

(58) Field of Classification Search
CPC .......... B60N 3/06; B60N 3/066; B60N 3/063; B60R 16/02
USPC .............. 296/75; 74/564; 297/423.1, 423.41, 297/423.42
See application file for complete search history.

(56) References Cited

U.S. PATENT DOCUMENTS

| | | | | |
|---|---|---|---|---|
| 3,287,992 A * | 11/1966 | Smith | .................... | B60K 26/02 251/295 |
| 3,860,284 A * | 1/1975 | Lichtig | .................. | B60N 3/066 180/90.6 |
| 4,871,209 A * | 10/1989 | Handelman | .............. | A47C 3/16 297/378.1 |
| 5,679,432 A * | 10/1997 | Holmquest | ............... | B32B 5/18 428/71 |
| 6,010,191 A * | 1/2000 | Calinaud | .............. | B60N 2/2356 297/365 |
| 6,283,529 B2 * | 9/2001 | Kitagawa | ............... | B60N 3/066 296/187.09 |
| 6,390,488 B1 * | 5/2002 | Wallingsford | ........... | B62J 25/00 280/291 |
| 6,761,389 B2 * | 7/2004 | Akasaka | ................. | B60N 3/066 296/75 |
| 7,055,893 B2 * | 6/2006 | Yamamura | ............. | B60N 3/066 296/187.08 |
| 7,967,358 B2 | 6/2011 | Shukuri et al. | | |
| 9,045,059 B1 | 6/2015 | Davies et al. | | |

(Continued)

FOREIGN PATENT DOCUMENTS

| | | | | |
|---|---|---|---|---|
| CN | 104176132 A | 12/2014 | | |
| DE | 2608157 A1 * | 9/1977 | .............. | F16B 5/125 |

(Continued)

OTHER PUBLICATIONS

English Machine Translation of JP2007223558A.
English Machine Translation of JP2004345478A.
English Machine Translation of CN104176132A.

*Primary Examiner* — Milton Nelson, Jr.
(74) *Attorney, Agent, or Firm* — Vichit Chea; King & Schickli, PLLC

(57) ABSTRACT

A footrest assembly is provided for a motor vehicle. That footrest assembly includes a footrest, a wiring shield and a foam body sandwiched between the footrest and the wiring shield.

14 Claims, 2 Drawing Sheets

(56) References Cited

U.S. PATENT DOCUMENTS

| | | | |
|---|---|---|---|
| 9,162,599 B1 | 10/2015 | Mesias | |
| 9,365,144 B2 * | 6/2016 | Bouillon | ................... B60N 3/06 |
| 2005/0029790 A1 * | 2/2005 | Dendo | ................... B60N 3/066 |
| | | | 280/751 |
| 2014/0137695 A1 * | 5/2014 | Permut | ................ B60N 2/5685 |
| | | | 74/513 |

FOREIGN PATENT DOCUMENTS

| | | | | |
|---|---|---|---|---|
| DE | 102015213790 A1 * | 1/2017 | ............. | B60R 21/04 |
| DE | 102015213792 A1 * | 1/2017 | ............. | B60R 21/04 |
| FR | 2681756 A1 * | 3/1993 | ......... | H01H 85/2045 |
| JP | 2004345478 A * | 12/2004 | | |
| JP | 2007223558 A | 9/2007 | | |

\* cited by examiner

FOOTREST ASSEMBLY FOR A MOTOR VEHICLE

TECHNICAL FIELD

This document relates generally to the motor vehicle equipment field and, more particularly, to a new and improved footrest assembly that provides a solid feel yet will collapse during a crash in order to reduce leg and femur loading.

BACKGROUND

This document relates to a new and improved footrest assembly that is directly attached to the sheet metal of the motor vehicle. Advantageously, the footrest assembly incorporates a structure that provides a solid, high-quality feel while also allowing for the necessary deflection and compression during a crash impact to reduce leg and femur loading for the benefit of the motor vehicle driver. It is a difficult engineering task to meet these seemingly conflicting requirements.

SUMMARY

In accordance with the purposes and benefits described herein, a footrest assembly is provided for a motor vehicle. That footrest assembly comprises a footrest, a wiring shield and a foam body sandwiched between the footrest and the wiring shield.

The footrest may include a footrest element and a support plate. That support plate may include a locating pin that is received in an aperture in the foam body and a locating aperture in the wiring shield.

The foam body may be made from an expanded polypropylene foam. Further, the foam body may include a recess that receives and holds the support plate.

A fastener secures the footrest assembly together. That fastener may be received in a first aperture in the support plate, a second aperture in the foam body and a third aperture in the wiring shield. In one possible embodiment the fastener comprises a fluted push pin.

The footrest assembly may further include a support plate connector that secures the actual footrest with the support plate. That connector may comprise and plurality of spring clip fasteners.

Still further, the footrest assembly may include an anchor for securing the wiring shield directly to the sheet metal of the motor vehicle. That anchor may comprise a plurality of welding studs.

In the following description, there are shown and described several preferred embodiments of the footrest assembly. As it should be realized, the footrest assembly is capable of other, different embodiments and its several details are capable of modification in various, obvious aspects all without departing from the footrest assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the footrest assembly and together with the description serve to explain certain principles thereof. In the drawing figures.

Reference will now be made in detail to the present preferred embodiments of the footrest assembly, examples of which are illustrated in the accompanying drawing figures.

DETAILED DESCRIPTION

Figure 1:
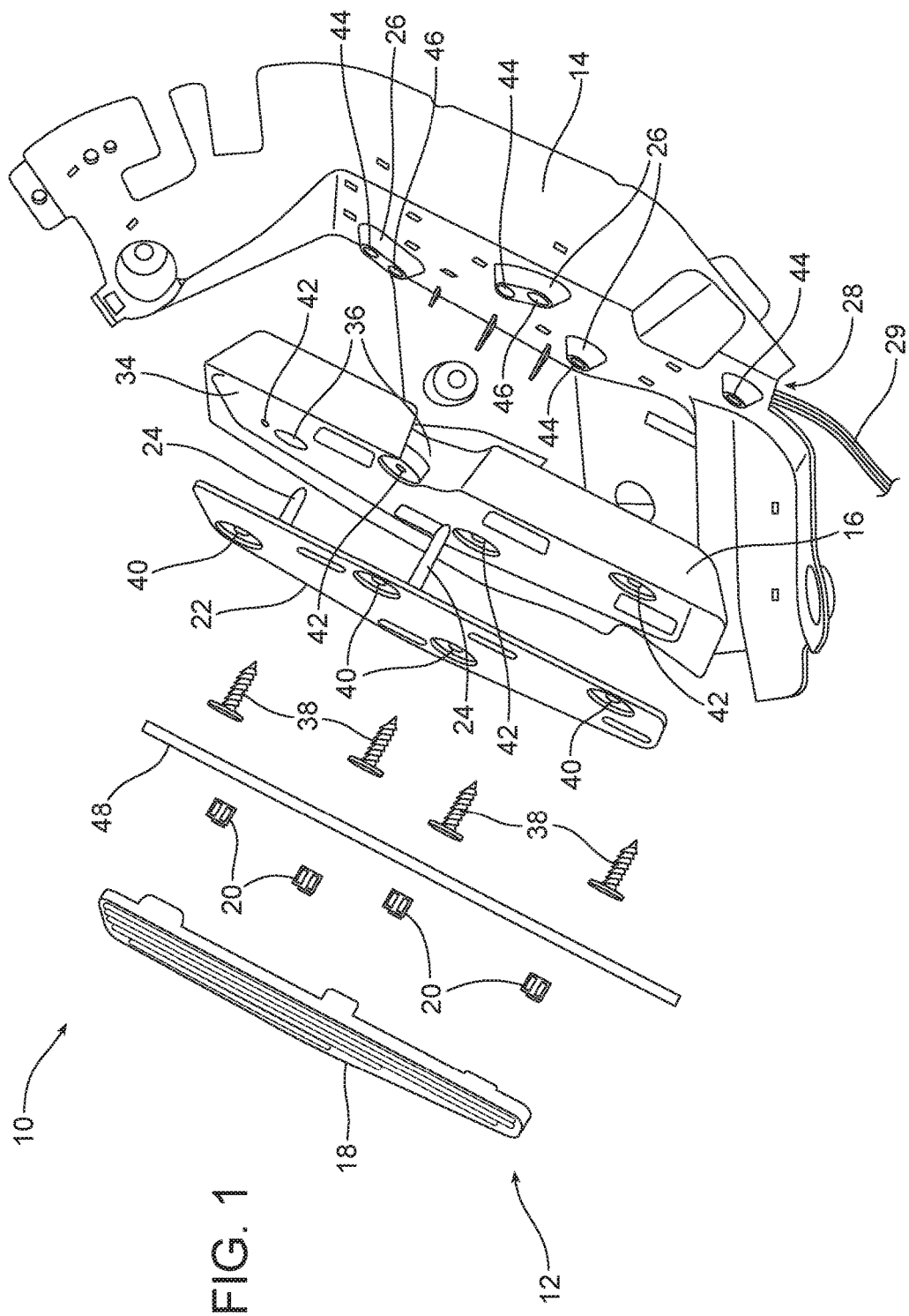
FIG. 1 is an exploded perspective view of the footrest assembly.
Figure 2:
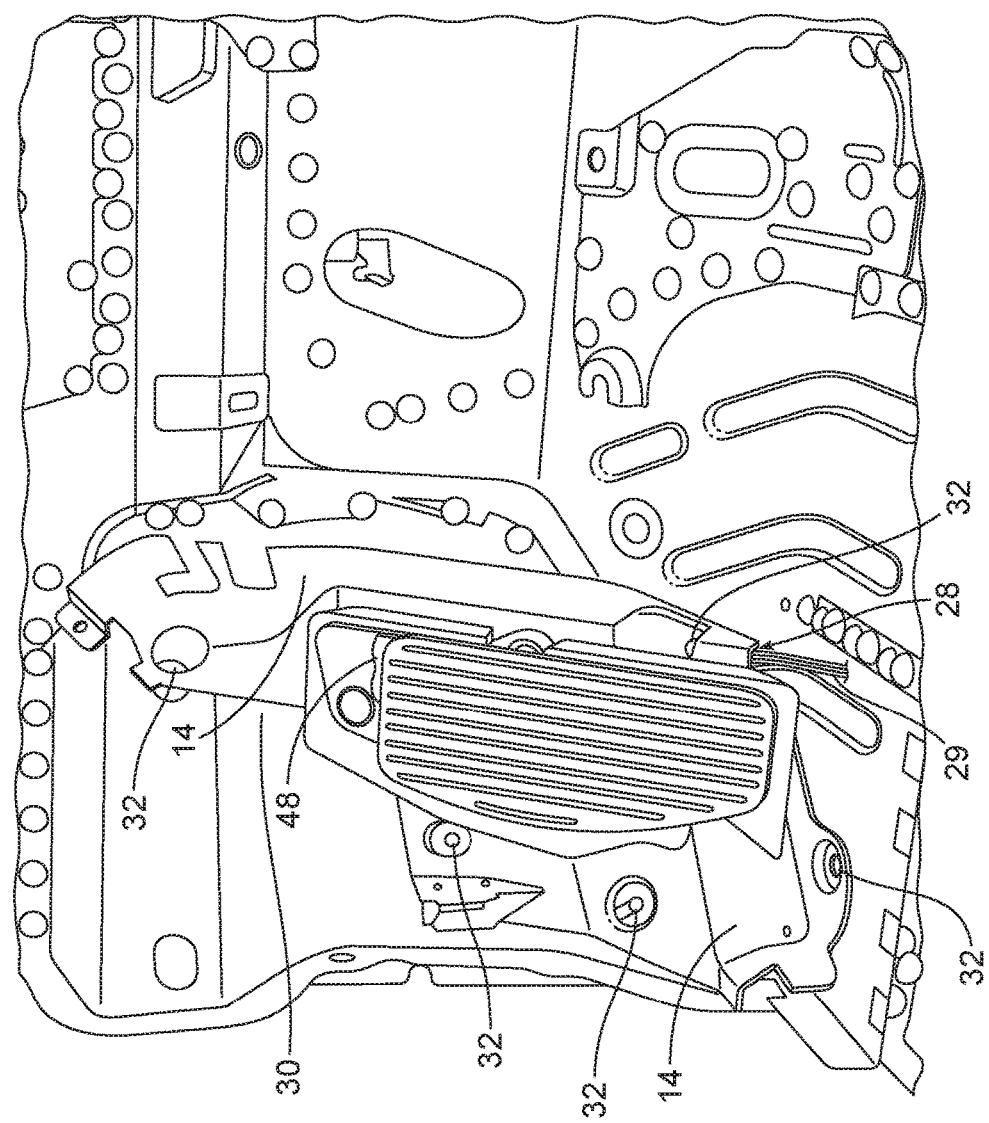
FIG. 2 is a perspective view of the fully assembled footrest assembly.

Reference is now made to FIGS. 1 and 2 illustrating the footrest assembly 10. The footrest assembly 10 may be generally described as including a footrest 12, a wiring shield 14 and a foam body 16 sandwiched between the footrest and the wiring shield.

In the illustrated embodiment, the footrest 12 includes a footrest element 18 connected by a support plate connector 20 to a support plate 22. In the illustrated embodiment, the support plate connector 20 comprises a plurality of spring clip fasteners. In one possible embodiment, the footrest element 18 is injection molded from an appropriate plastic or composite material and the support plate 22 is a relatively thick (e.g. 2.5 mm thick) rigid plate molded from a plastic or composite material and incorporating integral locating pins 24.

The wiring shield 14 may also be molded from a plastic or composite material. In one possible embodiment, the wiring shield 14 includes a plurality of raised bosses 26 on the front face. The rear face defines a cavity 28 which functions as a pathway for a wiring harness 29 or the like. As best illustrated in FIG. 2, the wiring shield 14 is secured directly to the sheet metal 30 of the motor vehicle by means of an anchor 32. In the illustrated embodiment, the anchor 32 comprises a plurality of welding studs. As should be appreciated, when the wiring shield 14 is properly secured to the sheet metal 30, the cavity 28 is closed yet it defines a pathway for a wiring harness 29 between the two structures.

The foam body 16 may be made from a material particularly suited to reduce leg and femur loading in the event of a crash. One such material is expanded polypropylene. More specifically, the foam body 16 deflects and compresses easily under crash conditions.

At the assembly line, the wiring harness 29 is positioned along the sheet metal 30 and the wiring shield 14 is anchored in position on the sheet metal 30 over the wiring harness 29 by means of the welding studs 32.

Next, the support plate 22 is attached to the crash foam 16. More specifically, the locating pins 24 on the bottom of the support plate 22 are aligned with apertures 36 in the foam body 16 and the support plate 22 and foam body 16 are pressed together until the support plate seats fully in the support plate shaped recess 34 in the face of the foam body 16. Fasteners 38 are provided in aligned apertures 40 in the support plate and apertures 42 in the foam body 16 to complete the connection. In the illustrated embodiment those fasteners 38 are fluted pushpins. Those same fasteners/fluted pushpins 38 are utilized to secure the support plate 22 and foam body 16 to the wiring shield 14. More specifically, the fasteners, fluted push pins 38 are secured in mounting apertures 44 provided in the bosses 26 on the wiring shield 14. Here it should be noted that the locating pins 24 on the support plate 22 also engage locating apertures 46 in the bosses 26 of the wiring shield 14 to ensure proper alignment of the component parts when completing this portion of the assembly process.

Next, carpet 48 is installed over the support plate 22. The footrest element 18 is then secured to the support plate 22 by means of the support plate connectors or plurality of spring clips 20 through holes cut in the carpet 48.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A footrest assembly for a motor vehicle, comprising:
   a footrest;
   a wiring shield including a cavity adapted as a wiring harness pathway;
   a wiring harness received in said wiring harness pathway; and
   a foam body sandwiched between said footrest and said wiring shield.

2. The footrest assembly of claim 1, wherein said foam body is made from an expanded polypropylene foam.

3. The footrest assembly of claim 1, further including an anchor securing said wiring shield directly to a sheet metal support.

4. The footrest assembly of claim 3, wherein said anchor is a plurality of welding studs.

5. The footrest assembly of claim 1, wherein said footrest includes a footrest element and a support plate.

6. The footrest assembly of claim 5, wherein said foam body includes a recess that receives and holds said support plate.

7. The footrest assembly of claim 5, wherein said support plate includes a locating pin that is received in an aperture in said foam body and a locating aperture in said wiring shield.

8. The footrest assembly of claim 7, wherein said foam body is made from an expanded polypropylene foam.

9. The footrest assembly of claim 7, wherein said foam body includes a recess that receives and holds said support plate.

10. The footrest assembly of claim 9, including a fastener securing said footrest assembly together.

11. The footrest assembly of claim 10, wherein said fastener is received in a first aperture in said support plate, a second aperture in said foam body and a third aperture in said wiring shield.

12. The footrest assembly of claim 10, wherein said fastener is a fluted push pin.

13. The footrest assembly of claim 12, wherein said footrest further includes a footrest element and a support plate.

14. The footrest assembly of claim 13, further including a support plate connector comprising a plurality of spring clip fasteners.

* * * * *